United States Patent [19]

Ogawa et al.

[11] Patent Number: 5,075,411
[45] Date of Patent: Dec. 24, 1991

[54] CURABLE EPOXY RESIN COMPOSITION FOR STRUCTURAL PARTS CONTAINING POLYAMINE DERIVED MANNICH BASE AND NOVOLAC OR BISPHENOL F EPOXY RESIN

[75] Inventors: Akio Ogawa; Yukio Ohsaki, both of Saitama; Takeichiro Takehara; Tadashi Ashida, both of Kanagawa; Seiichiro Hashimoto, Tokyo, all of Japan

[73] Assignees: Nissan Motor Co., Kanagawa; Tsuchiya Mfg. Co., Ltd., Tokyo; Asahi Denka Kogyo K.K., Tokyo; A.C.R. Co., Ltd., Tokyo, all of Japan

[21] Appl. No.: 480,786

[22] Filed: Feb. 16, 1990

[30] Foreign Application Priority Data

Mar. 7, 1989 [JP] Japan .................... 1-54562

[51] Int. Cl.⁵ ................... C08G 59/50; C08G 59/54
[52] U.S. Cl. .......................... 528/99; 528/97; 528/98; 525/504
[58] Field of Search ............ 528/99; 525/504

[56] References Cited

U.S. PATENT DOCUMENTS 3,751,471  8/1973  Becker .................. 528/162
3,950,451  4/1976  Suzuki et al. ........... 528/107
4,269,742  5/1981  Goeke et al. ........... 528/96

OTHER PUBLICATIONS

Lee and Neville, "Handbook of Epoxy Resins", McGraw-Hill, Inc. 1967, pp. 4-5 to 4-6.

Primary Examiner—John Kight, III
Assistant Examiner—Frederick Krass

[57] ABSTRACT

A curable epoxy resin composition comprises (I) an epoxy resin and (II) a curing agent. It may comprise (III) another curing agent. It is preferable for it to comprise 25 to 95 wt.% of (I) and 5 to 45 wt.% of (II).

① an epoxy resin (I) represented by the general formula:

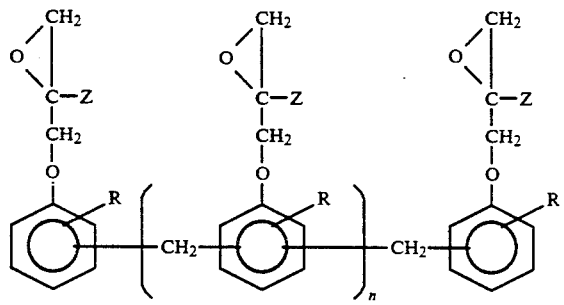

wherein Z represents a group selected from among a hydrogen atom, a methyl group and an ethyl group, R represents a group selected from among a hydrogen atom and alkyl groups, and n represents a number of 0 to 1.6, and ② a curing agent comprising a polyamine reaction composition (II) obtained by reacting 1 mol of a phenol (II-1) having at least one unsubstituted reactive site in the aromatic nucleus with at least 1 mol of an aliphatic polyamine (II-2) and at least 1 mol of a carbonyl compound (II-3) having at least one carbonyl group in the molecule.

7 Claims, No Drawings

CURABLE EPOXY RESIN COMPOSITION FOR STRUCTURAL PARTS CONTAINING POLYAMINE DERIVED MANNICH BASE AND NOVOLAC OR BISPHENOL F EPOXY RESIN

The present invention relates to a curable epoxy resin composition for structural parts.

PRIOR ART

In Europe and the United States, a so-called "gasohol" which is a mixture of an automobile fuel (gasoline) with an alcohol such as methanol is used. At present, methanol poses substantially no problem of damaging adhesives now used in the structural part of a fuel system, such as rubber adhesives, epoxy resin/polyamide curing agents and epoxy resin/aliphatic amine curing agents, since the methanol content of the fuel is not so high. However, in the future, fuels having a high methanol content will be used for automobiles in order to prevent environmental pollution or as a substitute for petroleum.

However, when a gasoline mixture having a methanol content broadly varying from a low to a high level is used, the above-described adhesives used at present will have problems such as swelling, peeling off and cracking.

An object of the present invention is to provide a curable epoxy resin composition for structural parts which is free from these problems.

SUMMARY OF THE INVENTION

A curable epoxy resin composition for structural parts of the present invention is characterized by comprising as indispensable constituents:

① epoxy resin (I) represented by the general formula:

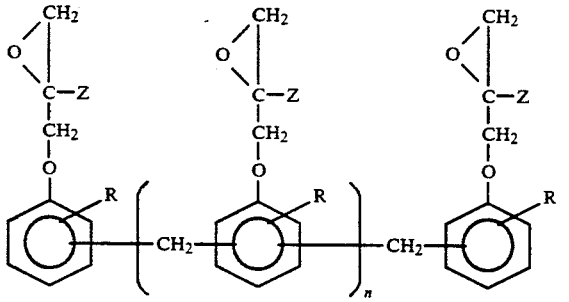

wherein Z represents a group selected from among a hydrogen atom, a methyl group and an ethyl group, R represents a group selected from among a hydrogen atom and alkyl groups, and n represents a number of 0 to 1.6, and ② a curing agent comprising a polyamine reactive composition (II) obtained by reacting 1 mol of a phenol (II-1) having at least one unsubstituted reactive site in the aromatic nucleus with at least 1 mol of an aliphatic polyamine (II-2) and at least 1 mol of a carbonyl compound (II-3) having at least one carbonyl group in the molecule.

Another curable epoxy resin composition for structural parts of the present invention is characterized by comprising as indispensable constituents:

① an epoxy resin (I) represented by the general formula:

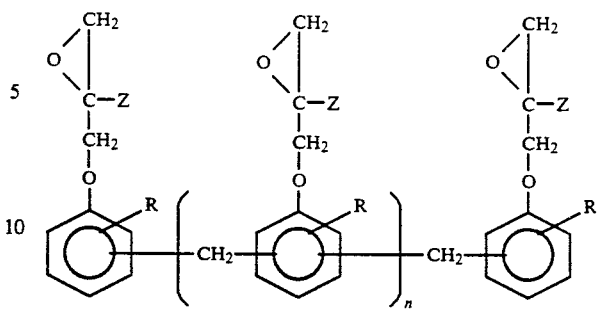

wherein Z represents a group selected from among a hydrogen atom, a methyl group and an ethyl group, R represents a group selected from among a hydrogen atom and alkyl groups, and n represents a number of 0 to 1.6, ② a curing agent comprising a polyamine reaction composition (II) obtained by reacting 1 mol of a phenol (II-1) having at least one unsubstituted reactive site in the aromatic nucleus with at least 1 mol of an aliphatic polyamine (II-2) and at least 1 mol of a carbonyl compound (II-3) having at least one carbonyl group in the molecule, and ③ a curing agent comprising a polyamide amine compound (III) obtained by reacting a dicarboxylic acid of the general formula:

HOOC—(CH$_2$)$_m$—COOH wherein m represents a number of 4 to 12, or an ester derivative thereof (III-1) with an aliphatic polyamine (III-2).

The curable eposy resin composition of the invention comprises (I) the epoxy resin and (II) the curing agent. It may comprises (III) the curing agent. It is preferable that it comprises 25 to 95 wt. % of (I) and 5 to 45 wt. % of (II).

Preferred epoxy resins (I) usable as the indispensable constituent of the present invention include the following ones:

(1) epoxy resins produced by reacting a dihydric phenol usually available under the trade name of bisphenol F, such as 3,4'-dihydroxydiphenylmethane, bis-(2-hydroxyphenyl)methane or bis-(4-hydroxyphenyl)methane or a polynuclear polyhydric phenol such as a precondensate of a phenol with an aldehyde (e.g. a phenolic resin precondensate) (hereinafter inclusively referred to as the "polyhydric phenol") with an epihalohydrin in the presence of a reactive amount of a basic catalyst or basic compound such as sodium hydroxide by an ordinary process, (2) epoxy resins produced by reacting a polyhalohydrin ether, obtained by reacting the above-described polyhydric phenol with an epihalohydrin in the presence of a catalytic amount of an acidic catalyst such as boron trifluoride by an ordinary process, with a basic compound such as sodium hydroxide, and (3) epoxy resins produced by reacting a polyhalohydrin ether, obtained by reacting the above-described polyhydric phenol with an epihalohydrin in the presence of a catalytic amount of a basic catalyst such as triethylamine by an ordinary process, with a basic compound such as sodium hydroxide.

These bisphenol F-type epoxy resins are available on the market under trade names of, for example, Epoxy R-97 and R-98 (products of ACR), Adeka Resin EP-4900 and EP-4901 (Products of Asahi Denka Kogyo), Eipkote 807 (a product of Shell) and DTC-830 (a product of Dainippon Ink & Chemicals).

Those preferably usable as the epoxy resin (I) in the present invention further include novolak-type epoxy resins such as phenol novolak epoxy resin and cresol novolak epoxy resin. These novolak-type epoxy resins are available on the market under trade names of, for example, Epiclon N-730 (a product of Dainippon Ink & Chemicals), Epikote 152 and 154 (products of Shell), EPN-1139 and 1138 (products of Ciba-Geigy) and DEN 431 and 438 (products of Dow Chemical).

The above-described epoxy resin (I) can be used in combination with another epoxy resin in the present invention. The latter epoxy resins thus usable include bisphenol A-type epoxy resin, halogenated epoxy resins, diglycidyl ether compounds produced by reacting resorcinol with an epihalohydrin, glycidyl ester-type epoxy resins, polyglycol-type epoxy resins, cycloaliphatic epoxy resins, hydantoin-type epoxy resins, glycidylamine-type epoxy resins and adjacent epoxy group-containing epoxy resins as described in "Epoxy Jushi no Seizo to Oyo" edited by Hiroshi Kakikuchi.

The epoxy resin (I) is used in combination with the other epoxy resin in a mixing ratio of preferably 50 to 100/0 to 50, still preferably 70 to 100/0 to 30 (wt. %).

The phenol (II-1) having at least one unsubstituted reactive site in the aromatic nucleus constituting the composition of the present invention may be either monocyclic or polycyclic, mononuclear or polynuclear, and unsubstituted or substituted with a halogen atom, a nitro group, an alkyl group, an alkoxy group or the like. Among the phenols (II-1), preferred are monohydric phenols of the general formula:

HO—(Ar)—(X)$_p$      (1)

wherein Ar represents an aromatic residue, X represents a halogen atom or an alkyl or alkoxyl group as a substituent of the nucleus and X groups in the molecule may be either the same or different from one another, p represents a number ranging from 0 to that smaller than the substitutable hydrogen atoms of Ar by 1, and the aromatic residue may be either mononuclear or polynuclear and monocyclic or polycyclic.

Among them, especially preferred are phenol, naphthol and alkylphenols, halogenated phenols and alkoxyphenols which will be described below.

The alkylphenols include o-, m- and p-cresol, p-tert-butylphenol octylphenol, nonylphenol, xylenol and ethylphenol.

The halogenated phenols include chlorophenol and the alkoxyphenols include anisole.

Among them, the most preferred are phenol and o-, m- and p-cresol. They are used either alone or in the form of a mixture of two or more of them.

The aliphatic polyamines (II-2) used in the present invention are preferably diethylenetriamine, triethylenetetramine, tetraethylenepentamine, pentaethylenehexamine, iminobispropylamine, etc.

The carbonyl compound (II-3) usable in the present invention is a compound having at least one —CHO or >C=O group in the molecule.

The carbonyl compounds (II-3) include formaldehyde, paraformaldehyde, crotonaldehyde, acetaldehyde, chloral, furfurylaldehyde, adipaldehyde, succinaldehyde, glyoxal and acetone.

The carbonyl compounds (II-3) are preferably aldehydes and reactive derivatives thereof such as aliphatic lower aldehydes, e.g. formaldehyde, paraformaldehyde, acetaldehyde and chloral. Among them, formaldehyde and reactive derivatives thereof are preferred.

For example, formaldehyde is usable in the form of an aqueous solution thereof or a solution thereof in an organic solvent such as methanol.

Although the polyamine reaction composition (II) can be prepared from the phenol (II-1) having at least one unsubstituted reactive site in the aromatic nucleus, the aliphatic polyamine (II-2) and the carbonyl compound (II-3) having at least one carbonyl group in the molecule by reacting all of the reactants, i.e. phenol (II-1), aliphatic polyamine (II-2) and carbonyl compound (II-3) in one step, it is preferred to conduct the reaction in two or more steps. The reaction can be conducted by, for example, a process wherein the carbonyl compound (II-3) is added to a mixture of the phenol (II-1) with the aliphatic polyamine (II-2), a process wherein the phenol (II-1) is previously reacted with the carbonyl compound (II-3) and the reaction product is reacted with the aliphatic polyamine (II-2), or a process wherein the aliphatic polyamine (II-2) is previously reacted with the carbonyl compound (II-3) and the reaction product is reacted with the phenol (II-1).

In the production of the reaction product, a compound by means of which the carbonyl compound (II-3) can enter a reaction, such as xylene, can be added to the reaction system.

The proportions of the phenol (II-1), aliphatic polyamine (II-2) and carbonyl compound (II-3) in the production of the polyamine reaction composition (II) from them will now be described.

The amount of the carbonyl compound (II-3) is such that it is not stoichiometrically excessive with respect to the phenol (II-1) but at least 1 mol per mol of the phenol (II-1). The amount of the aliphatic polyamine (II-2) is at least 1 mol per mol of the phenol (II-1) and may be in large excess. The molar ratio of the phenol (II-1)/aliphatic polyamine (II-2)/carbonyl compound (II-3) is preferably 1/1 to 3/1 to 3.

In other words, the amount of the carbonyl compound (II-3) is one which is enough for combining the phenol (II-1) with the aliphatic polyamine (II-2) and any excess thereof is not preferred. It is preferred that at least one amino group (preferably primary amino group) remains unreacted in the average molecule of the aliphatic polyamine (II-2).

From the viewpoint of the subsequent steps, it is usually desirable that the reaction product among the phenol (II-1), aliphatic polyamine (II-2) and carbonyl compound (II-3) is liquid.

Although the temperature of the reaction among the phenol (II-1), aliphatic polyamine (II-2) and carbonyl compound (II-3) is not particularly limited, it is desirable to add the carbonyl compound (II-3) to the reaction system at 40° C. or below and, after the completion of the addition, elevate the temperature to complete the reaction.

Since the reaction has started before the completion of the addition at 40° C. or below in this case, the temperature elevation is conducted in order to complete the reaction.

After the completion of the reaction, the reaction mixture is heated under reduced pressure to remove water, unreacted reactants and the solvent, if any, to recover the reaction product.

Preferred dicarboxylic acids or ester derivatives thereof (III-1) usable in the present invention include dicarboxylic acids such as adipic, 1,5-pentanedicarboxylic (pimelic), 1,6-hexanedicarboxylic (suberic), 1,7-heptanedicarboxylic (azelaic), sebacic, 1,9-nonanedicarboxylic, 1,10-decanedicarboxylic, 1,11-undecanedicarboxylic and 1,12-dodecanedicarboxylic acids and ester derivatives of these dicarboxylic acids. The alcohols usable for forming these esters include methyl, ethyl, propyl and butyl alcohols. The esterification can be conducted by an ordinary method.

As the aliphatic polyamines (III-2), those shown above as the examples of the aliphatic polyamines (II-2) are usable.

The ratio of the dicarboxylic acid or its ester derivative (III-1) to the aliphatic polyamine (III-2) used in the formation of the polyamide amine compound (III) is such that the ratio of the carboxylic acid equivalent or carboxylic ester equivalent of the dicarboxylic acid or its ester derivative (III-1) to the molar number of the aliphatic polyamine (III-2) is preferably 1/0.5 to 1.2, still preferably 1/0.6 to 1.1.

The polyamide amine compound (III) of the present invention can be produced by a known process such as a process wherein the reaction is conducted at 170° to 320° C., preferably 250° to 290° C., under atmospheric pressure when an imidazoline ring is to be formed or a process wherein the reaction is conducted at 120° to 200° C., preferably 140° to 180° C., under atmospheric pressure when no imidazoline ring formation is intended. In either process, the reaction temperature can be lowered under reduced pressure. The polyamide amine compound (III) having the imidazoline ring is preferred.

The curable epoxy resin composition for structural parts of the present invention comprises the epoxy resin (I), polyamine reaction composition (II), polyamide amine compound (III) and, if necessary, various additives such as a filler, leveling agent, antifoaming agent or coupling agent.

The fillers include inorganic fillers such as quartz powder, bitumen, cellulose, glass fiber, clay, mica powder, aluminum powder, alumina hydroxide, alumina, Aerosil (fine silica powder), calcium carbonate, talc, diatomaceous earth and kaolin and organic fillers such as cellulose powder, vinyl chloride powder, chlorinated rubber powder and chlorinated polypropylene as well as substances similar to them. Also colorants such as a pigment can be added thereto if necessary.

The proportions of the components in the curable epoxy resion composition for structural parts of the present invention is not particularly limited and is, for example, as follows

|  | Usual range | Preferred range |
| --- | --- | --- |
| Epoxy resin (I) | 25 to 95 wt. % | 30 to 85 wt. % |
| Polyamine reaction compositin (II) | 5 to 45 wt. % | 10 to 35 wt. % |
| Filler and additives | 0 to 70 wt. % | 10 to 60 wt. % |

When the polyamide amine compound (III) is added, the amount thereof is such that the ratio of the polyamine reaction composition (II) to the polyamide amine compound (III) is 5 to 100 wt. %/0 to 95 wt. %, preferably 15 to 100 wt. %/0 to 85 wt. %. These ratios are based on the total weight of (II) and (III).

The curable epoxy resin composition for structural parts of the present invention is characterized in that it will cause no trouble such as swelling, peeling off or cracking even when it is immersed in a mixed gasoline containing an alcohol, such as methanol, in an amount ranging from a small to a large level over a long period of time unlike a conventional rubber adhesive or an adhesive comprising an epoxy resin/polyamide curing agent or an epoxy resin/aliphatic amine curing agent.

Therefore, the curable composition of the present invention is usable as an adhesive for structural parts of a fuel system of an automobile in which the so-called gasohol comprising a mixture of an automobile fuel (gasoline) with an alcohol, such as methanol, is used or in which a fuel having a high methanol content will be used in the future in order to prevent environmental pollution or as a substitute for petroleum.

Further, the curable composition of the present invention is usable for coating a soldered part of a fuel pump or electric wire and is effective in preventing corrosion of metallic parts.

EXAMPLES

The following Referential Examples, Examples and Comparative Examples will further illustrate the present invention, but by no means limit the present invention.

Preparation of polyamine reaction composition (II)

REFERENCE EXAMPLE 1

94 g of molten phenol was mixed with 103 g of diethylenetriamine in a four-necked flask provided with a stirrer, thermometer, condenser tube and dropping means. After cooling to 40° C., 81 g of 37% formalin was slowly added dropwise thereto while the temperature was kept below 40° C. After the completion of the addition, the stirring was continued at 40° C. for 30 min, the temperature was elevated and the stirring was conducted at 80° C. for 1 h to complete the reaction.

After the completion of the reaction followed by dehydration under a reduced pressure, 209 g of polyamine reaction composition ① was obtained.

REFERENCE EXAMPLE 2

100 g of m-cresol, 146 g of triethylenetetramine and 81 g of 37% formalin were reacted with one another in the same manner as that of Referential Example 1 to obtain 266 g of polyamine reaction composition ②.

Preparation of polyamide amine compound (III)

REFERENTIAL EXAMPLE 3

146 g of adipic acid and 378 g of tetraethylenepentamine were subjected to a dehydration reaction at 200° C. for 5 h, while nitrogen was introduced thereinto, in a four-necked flask provided with a stirrer, thermometer, condenser tube and nitrogen-inlet tube. The dehydration reaction was continued at 200° C. under a reduced pressure of 20 Torr for 2 h to form an imidazoline ring, thereby obtaining 452 g of polyamide amine compound ①.

REFERENTIAL EXAMPLE 4

202 g of sebacic acid was reacted with 292 g of triethylenetetramine in the same manner as that of Referential Example 3 to obtain 422 g of polyamide amine compound ②.

EXAMPLES 1 TO 3

The polyamine reaction compositions ① and ② obtained in Referential Examples 1 and 2, respectively, and an epoxy resin listed in Table 1 were mixed together in proportions specified in Table 1. The mixture was cured at room temperature for 10 days and then subjected to durability tests in various solvents to determine the durability thereof.

The results are shown in Table 1.

COMPARATIVE EXAMPLES 1 TO 3

The curing and durability tests were conducted in the same manner as that of Examples 1 to 3 except that only a bisphenol A-type epoxy resin was used as the epoxy resin or a modified aliphatic amine (Adeka Hardener EH-217) or triethylenetetramine was used as the curing agent.

The results are shown in Table 1.

It is apparent from Table 1 that the resistances to methanol and the gasoline/methanol mixture in the Examples 1 to 3 were superior to those in the Comparative Examples 1 to 3.

EXAMPLES 4 TO 6

The polyamine reaction composition ① obtained in Referential Example 1 was mixed with the polyamide amine compound ① or ② obtained in Referential Examples 3 or 4 and bisphenol F-type epoxy resin in relative amounts specified in Table 2. After curing at 100° C. for 20 min, the product was subjected to durability tests in various solvents to determine the durability thereof.

The results are shown in Table 2.

COMPARATIVE EXAMPLES 4 AND 5

Curing and durability tests in various solvents were conducted in the same manner as those of Examples 4 to 6 except that only polyamide amine compound ② was used as the curing agent or ACR Hardener H-285, which is a general-purpose polyamide amine, was used as the curing agent.

The results are shown in Table 2.

TABLE 1

| | | Ex. 1 | Ex. 2 | Ex. 3 | Comp. Ex. 1 | Comp. Ex. 2 | Comp. Ex. 3 |
|---|---|---|---|---|---|---|---|
| Proportion (parts by weight) | Adeka Resin EP-4900*[1] | 100 | 100 | 80 | — | 100 | 100 |
| | Epikote 828*[2] | — | — | 20 | 100 | — | — |
| | Polyamine reaction composition ① | 30 | — | 30 | 30 | — | — |
| | Polyamine reaction composition ② | — | 30 | — | — | — | — |
| | Adeka Hardener EH-217*[3] | — | — | — | — | 20 | — |
| | Triethylenetetramine | — | — | — | — | — | 10 |
| After immersion in methanol for 14 days (40° C.) | | | | | | | |
| Weight change (%) | | +0.7 | +0.8 | +1.1 | +3.5 | +2.5 | +3.0 |
| Surface condition*[4] | | ⊚ | ⊚ | ⊚ | Δ | Δ | Δ |
| After immersion in gasoline for 14 days (40° C.) | | | | | | | |
| Weight change (%) | | +0.1 | +0.1 | +0.1 | +0.5 | +0.1 | +0.3 |
| Surface condition*[4] | | ⊚ | ⊚ | ⊚ | ⊚ | ⊚ | ⊚ |
| After immersion in methanol/gasoline (50%/50%) (40° C.) for 14 days | | | | | | | |
| Weight change (%) | | +0.2 | +0.3 | +0.4 | +3.0 | +1.5 | +2.0 |
| Surface condition*[4] | | ⊚ | ⊚ | ⊚ | Δ | Δ | Δ |

(Notes)
*[1]bisphenol F-type epoxy resin: epoxy equivalent = 180 (a product of Asahi Denka Kogyo)
*[2]bisphenol A-type epoxy resin: epoxy equivalent = 190 (a product of Yuka Shell)
*[3]modified aliphatic amine: active hydrogen equivalent = 40 (a product of Asahi Denka Kogyo)
*[4]evaluation of the surface condition:
  ⊚ no change at all
  Δ the luster of the surface was lost
  χ the swelling was evident

TABLE 2

| | | Ex. 4 | Ex. 5 | Ex. 6 | Comp. Ex. 4 | Comp. Ex. 5 |
|---|---|---|---|---|---|---|
| Proportion (parts by weight) | Adeka Resin EP 4900*[1] | 100 | 100 | 100 | 100 | — |
| | Adeka Resin EP 4100*[2] | — | — | — | — | 100 |
| | Polyamine reaction composition ① | 10 | 10 | 20 | — | — |
| | Polyamide amine compound ① | 20 | — | — | — | — |
| | Polyamide amine compound ② | — | 20 | 10 | 30 | — |
| | ACR Hardener H-285*[5] | — | — | — | — | 40 |
| After immersion in methanol for 14 days (40° C.) | | | | | | |
| Weight change (%) | | +1.1 | +1.0 | +0.8 | +2.0 | +7.0 |
| Surface condition*[4] | | ⊚ | ⊚ | ⊚ | Δ | χ |
| After immersion in gasoline for 14 days (40° C.) | | | | | | |
| Weight change (%) | | +0.1 | +0.1 | +0.05 | +0.2 | +1.0 |
| Surface condition*[4] | | ⊚ | ⊚ | ⊚ | ⊚ | Δ |
| After immersion in methanol/gasoline (50%/50%) (40° C.) for 14 days | | | | | | |
| Weight change (%) | | +0.5 | +0.6 | +0.3 | +1.0 | +6.5 |

TABLE 2-continued

|  | Ex. 4 | Ex. 5 | Ex. 6 | Comp. Ex. 4 | Comp. Ex. 5 |
|---|---|---|---|---|---|
| Surface condition*4 | ⊚ | ⊚ | ⊚ | ⊚ | χ |

(Notes)
*1 and *4 the same as those of Table 1.
*2 bisphenol A-type epoxy resin: epoxy equivalent = 190 (a product of Asahi Denka Kogyo)
*5 polyamide amine (general-purpose type): amine value: 400 (a product of ACR)

It is apparent from Table 2 that the products of Examples 4 to 6 had a methanol resistance and a gasoline/methanol mixture resistance superior to those of Comparative Examples 4 and 5.

EXAMPLES 7 AND 8

The polyamine reaction composition ① prepared in Referential Example 1 and the polyamide amine compound ① prepared in Referential Example 3 were used and the components were mixed together in the proportion specified in Table 3. After curing at 100° C. for 20 min, the durability test was conducted as follows:

DURABILITY TEST

The sample was immersed in a solvent mixture of methanol with gasoline (50%/50%) at 60° C. for 168 h, then in a solvent mixture of methanol with gasoline (15%/85%) at 60° C. for 168 h, then in a solvent mixture of methanol with gasoline (85%/15%) at 60° C. for 168 h and finally in gasoline at 60° C. for 168 h.

The extent of crack formation and weight change after the durability test were determined.

The results are shown in Table 3.

COMPARATIVE EXAMPLE 5

The curing and durability tests were conducted in the same manner as those of Examples 7 and 8 except that an epoxy/polyamide adhesive, which was a commercially available gasohol-resistant composition, was used.

The results are shown in Table 3.

TABLE 3

|  |  | Ex. 7 | Ex. 8 | Comp. Ex. 5 |
|---|---|---|---|---|
| Proportion (parts by weight) | ACR epoxy R-97*1 | 100 | 100 | — |
|  | Polyamine reaction composition ① | 30 | 10 | — |
|  | Polyamide amine compound ① | — | 20 | — |
|  | Calcium carbonate | 50 | 50 | — |
|  | Aerosil | 15 | 15 | — |
|  | Epoxy/polyamide adhesive*2 | — | — | 100/50 |
| Extent of crack formation after the |  | ⊚ | ○ | χ |

TABLE 3-continued

|  | Ex. 7 | Ex. 8 | Comp. Ex. 5 |
|---|---|---|---|
| durability test*3 |  |  |  |
| Weight change (%) | +1.5 | +1.6 | +3.5 |

(Notes)
*1 Bisphenol F-type epoxy resin: epoxy equivalent = 180 (a product of ACR)
*2 commercially available gasohol-resistant composition
*3 ⊚: not formed, ○: scarcely formed, χ: numerous cracks

EXAMPLES 9 TO 12

The polyamine reaction composition ① prepared in Referential Example 1 and the polyamide amine compound ① prepared in Referential Example 3 were used and the components were mixed together in the proportion specified in Table 4. After curing at 100° C. for 20 min, durability tests against various solvents was conducted.

The results are shown in Table 4.

TABLE 4

|  |  | Ex. 9 | Ex. 10 | Ex. 11 | Ex. 12 |
|---|---|---|---|---|---|
| Proportion (parts by weight) | DEN-431*1 | 100 | 50 | 100 | 50 |
|  | Adeka Resin EP-4900*2 | — | 50 | — | 50 |
|  | Polyamine reaction composition ① | 30 | 30 | 10 | 10 |
|  | Polyamide amine compound ① | — | — | 20 | 20 |
| After immersion in methanol for 14 days (40° C.) |  |  |  |  |  |
| Weight change (%) |  | +0.5 | +0.6 | +0.6 | +0.9 |
| Surface condition*3 |  | ⊚ | ⊚ | ⊚ | ⊚ |
| After immersion in gasoline for 14 days (40° C.) |  |  |  |  |  |
| Weight change (%) |  | +0.02 | +0.03 | +0.03 | +0.04 |
| Surface condition*3 |  | ⊚ | ⊚ | ⊚ | ⊚ |
| Methanol/gasoline = 50%/50% (40° C.) |  |  |  |  |  |
| Weight change (%) |  | +0.2 | +0.3 | +0.2 | +0.4 |
| Surface condition*3 |  | ⊚ | ⊚ | ⊚ | ⊚ |

(Notes)
*1 phenol novolak epoxy resin: epoxy equivalent = 200 (a product of Dow Chemical)
*2 bisphenol F-type epoxy resin: epoxy equivalent = 180 (a product of Asahi Denka Kogyo)
*3 evaluation of the surface condition: ⊚ : no change at all, Δ: the luster of the surface was lost, χ: the swelling was evident.

What is claimed is:

1. A curable epoxy resin composition comprising (I) an epoxy resin represented by the general formula:

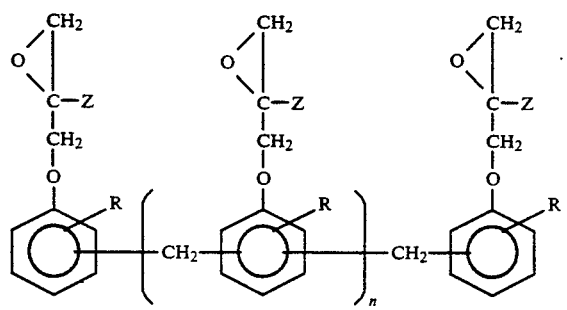

wherein Z is a member selected from among a hydrogen atom, a methyl group and an ethyl group, R is a member selected from among a hydrogen atom and an alkyl group, and n is a number of from 0 to 1.6, and (II)

a curing agent comprising a polyamine reaction composition obtained by a process consisting essentially of reacting 1 mol of a phenol having at least one unsubstituted reactive site in the aromatic nucleus with at least 1 mol of an aliphatic polyamine having at least three amine groups and at least 1 mol of a carbonyl compound having at least one carbonyl group in the molecule.

2. The composition as claimed in claim 1, which comprises 25 to 95 wt. % of (I) and 5 to 45 wt. % of (II).

3. The composition as claimed in claim 1, wherein said aliphatic polyamine is selected from the group consisting of diethylenetriamine, triethylenetetramine, pentaethylenehexamine and iminobispropylamine.

4. The composition as claimed in claim 1, wherein said carbonyl compound is selected from the group consisting of formaldehyde, paraformaldehyde, crotonaldehyde, acetaldehyde, chloral, furfuryladehyde, adipaldehyde, succinaldehyde, glyoxal and acetone.

5. The composition as claimed in claim 1, wherein said phenol having at least one unsubstituted reactive site is selected from the group consisting of phenol, ortho-cresol, meta-cresol, para-cresol and mixtures thereof.

6. The composition as claimed in claim 1, which comprises 30 to 85 wt. % of epoxy resin (I) and 10 to 35 wt. % of the curing agent (II).

7. The composition as claimed in claim 1, wherein said polyamine reaction composition is obtained by reacting diethylenetriamine, phenol and formaldehyde.

* * * * *